United States Patent [19]

Läufer et al.

[11] 4,007,050

[45] Feb. 8, 1977

[54] HYDROPHOBIC OXIDES OF METALS AND FOR METALLOIDS

[75] Inventors: Siegmar Läufer; Roy Waldemar, both of Rheinfelden, Germany

[73] Assignee: Deutsche Gold- und Silber-Scheideanstalt vormals Roessler, Frankfurt, Germany

[22] Filed: Jan. 23, 1975

[21] Appl. No.: 543,368

Related U.S. Application Data

[60] Division of Ser. No. 241,761, April 6, 1972, Pat. No. 3,920,865, which is a continuation-in-part of Ser. No. 23,330, March 27, 1970, abandoned.

[30] Foreign Application Priority Data

Mar. 29, 1969 Germany .......................... 1916360

[52] U.S. Cl. ........................................... 106/308 Q
[51] Int. Cl.² ........................................... C09C 3/12
[58] Field of Search ............................... 106/308 Q

[56] References Cited

UNITED STATES PATENTS

| 3,004,859 | 10/1961 | Lichtenwalner | 106/308 Q |
| 3,024,126 | 3/1962 | Brown | 106/308 Q |
| 3,085,905 | 4/1963 | Prevot et al. | 106/308 Q |
| 3,128,196 | 4/1964 | Pierpoint | 106/308 Q |
| 3,132,961 | 5/1964 | Pierpoint et al. | 106/308 Q |
| 3,377,311 | 4/1968 | Roch | 106/308 Q |
| 3,556,830 | 1/1971 | Charrin et al. | 106/308 Q |

*Primary Examiner*—J. Poer
*Attorney, Agent, or Firm*—Cushman, Darby & Cushman

[57] ABSTRACT

Highly dispersed metal or metalloid oxides are rendered hydrophobic by

I. contacting such oxide particles while in the form of an aerogel with a dry inert gas stream in a fluidizing bed at a temperature from 600° to 1000° C and at atmospheric pressure for a period of less than 60 seconds to render the particles absolutely dry and thus activate them;

II. charging the resultant dried and activated particles in a fluidizing bed with at least one gas-phase organosilicon compound selected from the group consisting of (a) linear organopolysiloxanes (b) cyclic organopolysiloxanes (c) a mixture of both types of siloxanes and (d) a mixture of any of the substances (a)–(c) with an organohalogenosilane at a temperature in the range from 25° to 650° C;

III. causing said charged particles to react with the organosilicon compounds at a temperature from 35° to 650° C; and IV. finally treating the reaction product with an inert gas stream in a fluidizing bed at temperatures from 500° to 125° C.

13 Claims, 1 Drawing Figure

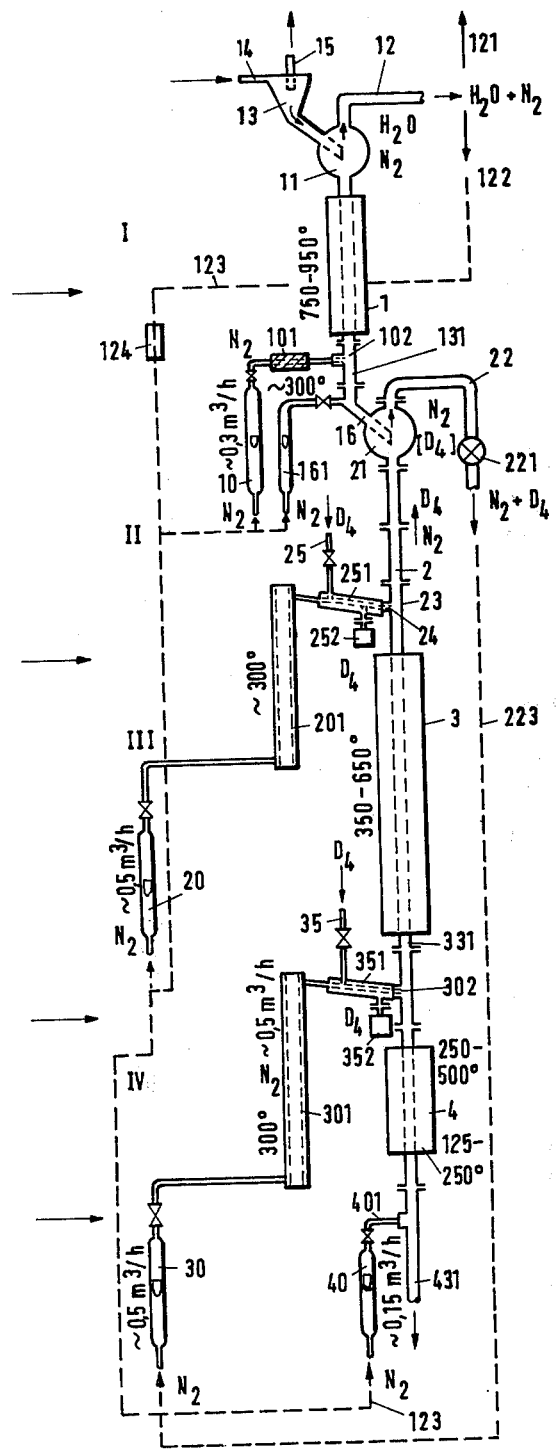

HYDROPHOBIC OXIDES OF METALS AND FOR METALLOIDS

REFERENCE TO RELATED APPLICATIONS

This application is a division of application Ser. No. 241,761, filed on Apr. 6, 1972 now U.S. Pat. No. 3,920,865 which, in turn, is a continuation-in-part of the abandoned application Ser. No. 23,330 by the same inventors in respect of Process of Hydrophobizing Highly Dispersed Oxides and filed on Mar. 27, 1970.

BACKGROUND OF THE INVENTION

This invention relates to a process for product obtained by hydrophobizing highly dispersed oxides, mixed oxides and oxide mixtures of metals and/or metalloids by treating the oxide particles with volatilizable organosilicon compounds in the gas phase.

It is known to hydrophobize highly dispersed oxides (active fillers) which have been obtained by reaction of metal or metalloid compounds or volatile compounds thereof in vapor form at elevated temperatures in the presence of a hydrolyzing and possibly also an oxidizing agent. The oxides in this process are rendered hydrophobic by reaction with a halogen containing inorganic or organic silicon compound.

Oxide-aerogels usually are made by subjecting volatile compounds of metal or metalloids, particularly the halides or gas mixtures containing the same, in the gaseous phase to the hydrolyzing influence of water vapor, whereby the resulting oxides, present in the aerosol state, form aerogels and then isolating these products from the easily condensed, gaseous reaction products at a temperature above their dew points. The water vapor forming gas mixtures can consist of combustible, particularly hydrogen containing gas mixtures or compositions which form such mixtures and also of non-combustible, preferably oxygen containing gases. The oxides, obtained have a primary particle size of less than 150m$\mu$. As starting materials for this process, there may be used volatile halides and preferably chlorides and fluorides.

In the preparation of mixed oxides, different metals or metalloids or compounds thereof which are volatile are introduced simultaneously as gaseous mixtures into the thermal reaction, so as to cause the oxides to separate out in the form of mixed oxides. The preparation, on the other hand, of so-called oxide mixtures is effected by separately subjecting different volatile reaction compounds to the pyrolytic treatment but jointly converting the separate materials from the aerosol to the aerogel state, i.e., co-coagulating them, so that the obtained oxides are in the form of oxide mixtures. It is also possible to subject different and separate oxides after their preparation to a mechanical treatment for combining them to form oxide mixtures.

If, in the thermal reaction, halogen containing starting materials, for example, silicontetrachloride or silicontetrafluoride are used, there are obtained products which, as a result of their high adsorption capacities, contain large amounts of hydrogenhalide and also contain halogen directly bound to the metal or metalloid atom. These oxides are strongly acid in their reactions. Their contents of hydrohalic acid may, for example, amount to 0.1%, so that they have a pH value of about 1.8. These oxides exhibit predominantly hydrophilic properties.

For many purposes, for instance, for working highly dispersed filler materials into organic media, it is desirable that the filler material possess organophilic, that is, hydrophobic properties, for which organo-chlorosilanes and various other agents have been used in various processes. Thus, it is known to hydrophobize pulverulent silicic acid through treatment with alkylchlorosilanes so as to form a coating thereon. In this case, however, the chlorosilane present on the surface of the silicic acid adsorbs water giving rise to the formation of hydrochloric acid. The thus hydrophobized silicic acid must be freed from the formed hydrochloric acid.

Hydrophobizing of powdery silicic acid with silicone oils has also been proposed. This involves suspending the dry pulverulent silicic acid in an organic liquid.

Pyrogenic metal oxides which on their surface have free OH groups also have been treated with gaseous or readily vaporizable materials, such as alcohols or formaldehyde and ketenes, the oxides undergoing etherification, esterification or acetate formation. This treatment has been carried out following or simultaneously with a hydrolysis with water or steam. In the esterification there are obtained, similar to the relatively unstable products obtained in saponification, products which in general do not meet the requirements for stability in hydrophobic products. The esterification-modified products have therefore not achieved industrial importance as truly stable hydrophobic products.

It is furthermore known to treat highly dispersed oxides by hydrophobizing them with silanes in vapor form whereby the hydrophobizing agent is added directly after the formation of the oxide from the halide in the presence of steam and oxygen at a temperature under 500° C. The hydrophobizing takes place in the presence of free hydrogen halide formed in the production of the oxides, the hydrogen halide being present in large amounts. The resulting products do not have a pH value exceeding 2.0.

In the forementioned procedures, chemical reactions with the OH-groups on the oxide's surface do not take place, but the reaction rather is only with the surface adsorbed water, so that fine particle oxides in a stable form are not obtained. A stable hydrophobized material can be obtained only when a chemical reaction is involved. Only highly dispersed oxides hydrophobized through a true chemical reaction do not undergo extraction, e.g. from carbon tetrachloride by shaking with water. The other products which are not formed by chemical reaction with the OH-groups are extracted into the aqueous phase, since by means of the carbontetrachloride the merely adsorbed organic molecule is dissolved off its surface.

Attempts for altering the properties of a precipitated metal or metalloid oxide by hydrophobizing the same through reaction of the OH-groups present on the surface thereof have not been lacking.

Thus in German Patent No. 1,163,784, a process is described for the surface treatment of highly dispersed metal and/or metalloid oxides which may be homogeneous oxides, or mechanical mixtures, or mixed oxides or oxide mixtures and which have free OH-groups on their surface. The oxides are obtained by thermal decomposition of volatile compounds of these metal and-/or metalloid compounds in vapor form in the presence of hydrolyzing and/or oxidizing gases or vapors. They are treated in uncondensed form obtained freshly from the place of their formation. Prior to the hydrophobizing treatment they are freed as far as possible of halogen, hydrogen halide, and adsorptively bound water under exclusion of oxygen. The oxides are then homogeneously mixed with hydrophobizing substances capable of reacting with the OH-groups. For this purpose they are introduced together with small amounts of steam and advantageously with an inert carrier gas into a continuously operated concurrent flow reactor in the form of a vertical tubular oven. The reaction chamber is heated to a temperature of 200° to 800° C and preferably to from 400° to 600° C. The resulting solid and gaseous reaction products are finally separated and the solid products are preferably deacidified and dried. Contact with oxygen is not effected till after cooling to below about 200° C.

The surface treatment with the compounds adapted for reaction with the OH-groups must take place in the presence of small amounts of steam with the result that the thermally destroyed groups are reformed. It is recommended that for 100 m$^2$ surface area of the oxide about 0.5 to 2.0 m mol water be introduced. The treating agent for the reaction is introduced in an amount dependent on the surface area and the ultimate application. A highly dispersed silicic acid having a surface area of 200 m$^2$/g has about 1 m mol/g free OH-groups. This would indicate that theoretically 1 mol/g of reagent should be introduced for reacting therewith. However, in practice, it is advantageous to use 1.5 m mol/g thereof.

As reactants for the surface treatment, there may be used in accordance with prior art process, any compounds which will react with OH-groups, as for instance, by etherification, esterification or acetal formation.

Suitable reactants include alcohols, aldehydes, ketenes, alkylene oxides and the like. Particularly good results are obtained if the oxide is reacted with the corresponding halide of the treatment compound. The finished oxides possess organophilic properties and can be dispersed in organic media, as for instance lacquers with advantageous results.

In order to obtain hydrophobic properties, there can be used the known hydrophobizing agents, preferably alkyl or aryl or mixed alkyl-aryl halogenosilanes and most preferably dimethyldichlorosilane, or also the corresponding esters of the silanes. The latter do not produce optimally stable products, but have the advantage that in their used hydrogen halide is not split off, thus eliminating the necessity for deacidification.

The organophilic or hydrophobic fillers produced by the aforesaid processes find many uses, for instance as free-flowing agents in powder systems, as fillers in special coating compounds, e.g. paint primers, as fillers for plastics and elastomers such as natural and synthetic rubber.

However, fillers for use in silicone rubber have to meet additional requirements, such as being halogen-free and having a greater thickening effect than the above mentioned hydrophobic products. These fillers are therefore preferably formed by treatment of the oxides with organosiloxanes. For this purpose, a number of processes have become known for "coating" natural and synthetic fillers, for instance silicic acid or materials containing the same. In this connection, the finely divided filler is mixed with the liquid siloxane or treated in a fluidizing bed with finely dispersed siloxane whereby more or less strongly adhering coatings on the filler surface are obtained. In order to obtain the optimum degree of adhesiveness between the hydrophobizing agent and the filler particles, it is necessary that there be a chemical bond between the two. The prior art processes have not been acceptable because of apparatus limitations or the time required for adequate mixing of the components.

To economically carry out the reaction of, for example, pyrogenically produced silicic acid with siloxanes, such as $D_4$ octamethylcyclotetrasiloxane, use is made in a prior art process (British Patent No. 932,753, U.S. Pat. No. 2,803,617) of an acid or like material as catalyst for the reaction.

According to another known procedure, the reaction is carried out without pressure but the treatment of the silicic acid is effected in batches and involves extended residence times, e.g. 3–4 hours in stages of the process. Thus a continuous process is hardly possible in an economical manner.

The object of the invention therefor is to provide highly dispersed oxidic fillers in an economically and technically feasible manner, which fillers are distinguished by their stability and optimal hydrophobic and organophilic properties and thereafter are particularly suitable for use as additives in silicone rubbers.

SUMMARY OF THE INVENTION

In accordance with the invention, a process is provided for hydrophobizing highly dispersed oxides, mixed oxides or oxide mixtures of metals and/or metalloids obtained by pyrogenic reaction which comprises treating the oxide particles with vaporizable organosilicon compounds in the gas phase, so as to form superior hydrophobic products entirely free of water, halogen, and hydrogenhalide. The characteristic feature of the invention, lies in subjecting the oxide particles to treatment in a fluidizing bed with a dry, inert gas stream at a temperature in the range of 600° to 1000° C, preferably 900° to 950° C, at atmospheric pressure for a period of a few seconds to a few minutes, and preferably during a period of 1 to 60 seconds, for absolutely drying the particles, that is, freeing the particles of all physically and chemically bound water; then charging the particles with gaseous linear and/or cyclic organopolysiloxanes or mixtures of one or both of these types of polysiloxanes with an organohalogensilane at a temperature of from 25° to 650° C and, preferably, 25° to 350° C; afterwards reacting the oxide particles and said organosilicon compounds at a temperature of from 350° to 650° C and thereafter treating the resulting product in a fluidizing bed with a dry inert gas stream at a temperature from 500° to 125° C.

BRIEF DESCRIPTION OF THE DRAWING

In the drawing an apparatus for carrying out the process of the invention is diagrammatically shown.

The absolute drying of the oxide particles in the first step of the process serves to produce a surface quality which not only provides superior adsorptive bonds with the organosilicon compound, but also an optimal covering of the surface with the hydrophobizing agent owing to the chemical reaction with the active surface.

This effect is best illustrated by using pyrogenically obtained silicic acid for exemplary purposes. The process of making pyrogenic $SiO_2$ results in a surface structure characterized by three types of so-called surface hydroxyl groups which are simultaneously present in each $SiO_2$-aerogel particle. These three hydroxyl group types are:

a. silanol groups present on the surface which because the groups are widely spaced apart have no possibility of interaction with one another and therefore may be designated isolated or "free" silanol groups;

b. silanol groups of the type set out under (a), which however are closely adjacent wherefor interaction can take place between them through hydrogen bridges and which therefore are designated "bound (hydrogen bridge) silanol groups"; and c. hydroxyl groups which form part of adsorbed water on the surface of the silicic acid aerogel.

During the short heat treatment of the oxide particles in the first step, the silanol groups at (b) and the hydroxyl groups (c) are decomposed, so that solely the free silanol groups at (a) remain resulting in a highly active oxide particle.

The high activity manifests itself not only in the addition, i.e., adsorption of reactive materials, but also in chemical reactions of the free silanol groups, which take place much more readily and completely than in the case of conventionally dried aerogels. The products obtained by heating in the first stage of the invention, give rise to considerable amounts of reactive siloxane groups which similarly to the silanol groups are suitable for splitting reactive materials and then reacting therewith, and which may also directly add to substances, as for instance, polar XH-compounds, such as alcohols, amines, etc.

The absolute drying in the first stage results in a highly active aerogel which is outstandingly sensitive to reactive materials and thus is eminently suitable for reacting with the hydrophobizing agent. This makes it possible to carry out all phases of the process, from the absolute drying to the subsequent hydrophobizing, in a continuous manner in a single, upright multiple tube apparatus. The highly dispersed oxide is introduced at the top of the apparatus and the finished product continuously withdrawn at the bottom. The apparatus can be constructed of a single or a multiple number of tubes arranged by adding one to the other, in case displaced against each other. Some parts of the apparatus may be heated, others may be unheated, there being at least one inlet for the hydrophobizing agent.

Suitable hydrophobizing agents include linear or cyclic organopolysiloxanes or mixtures thereof. Instances of such agents are hexamethyldisiloxane ($M_2$), hexamethylcyclotrisiloxane ($D_3$), octamethylcyclotetrasiloxane ($D_4$), octamethyltrisiloxane (MDM) and decamethyltetrasiloxane ($MD_2M$).

In the hydrophobizing phases, different hydrophobizing agents may be used, since, instead of the listed siloxanes, there may be used other compounds in the initial charging, such alkyl or aryl or alkylaryl mono-, di- or trichlorosilanes while in the main reaction siloxanes are used. It is also possible to introduce an organochlorosilane to at least one place and simultaneously to introduce a siloxane at, at least, one other point. Furthermore, suitable mixtures of the named or similar compounds can be introduced as a dust or in the gas phase through one, several, or all of the several inlet points.

The technical advantages of the process of the invention appear from the fact that the process can be operated continuously. All interfering water is removed before the reaction. In the reaction itself with predried oxide and polysiloxane water is not split off and since no water is present, no procedure for separating the product at the end of the process is necessary. The reaction components can be accurately measured out and there is no need to remove excess polysiloxane at the end of the reaction. The only product discharged in the end from the apparatus is the desired material.

In the examples, pyrogenic silicic acid ($SiO_2$) and $D_4$ as hydrophobizing agent have been used.

The reference numeral 1 designates an activating oven into which from a cyclone 13 provided with a gas outlet tube 15 for the carrier gas pyrogenic $SiO_2$ is introduced through an inlet 14 which empties into a separating chamber 11.

In the separating chamber 11, there is provided a gas outlet tube 12 for the water vapor driven off from the $SiO_2$.

The carrier gas can be taken off either at 121 or fed over 122 to a drier 124, in which case the dry carrier gas can be conveyed through an upper circulation duct 123 to the activating oven 1 or to an annexed charge zone 2.

From the activating oven 1, the activated $SiO_2$ is delivered over a conduit 131 into a separator chamber 21. In the upper part of the conduit 131, there empties a feedpipe 102, through which via a rotameter 10 and a heating oven 101, the drying gas such as nitrogen, carbon dioxide, air or a suitable mixture of superheated steam with said gases is fed. In the lower part of the conduit 131, there is provided a feedpipe 16 through which via a rotameter 161, nitrogen is fed in. The separating chamber 21 is provided with a gas outlet tube 22 which has arranged therein a pump 221 through which nitrogen and if necessary, an excess of siloxane ($D_4$) from the annexed charge zone 2, can be discharged into a lower circulation 223 for use in main reactor 3.

From the separating chamber 21, the $SiO_2$ is delivered into the charge zone 2, at the bottom of which a radiation source for UV light 23 is arranged. Beneath the UV light source 23, is a conduit 24 for $N_2$ which passes over a rotameter 20 and a preheater 201 and through an evaporator 251 for the $D_4$ which is introduced via a feedpipe 25, and is mixed with $N_2$ and then fed into the charge zone. The evaporator 251 is provided with a collecting vessel 252 for the possibly unevaporated $D_4$.

The charge zone 2 is linked with the reaction oven 3 which in turn through a connection 331 is joined to an after-treatment oven 4. In the connection 331, there empties a line 302 for $N_2$, which flows via a rotameter 30 and a preheater 301 into a further evaporator 351 into which, via a feedpipe 35, $D_4$ is introduced for the line 331. The evaporator 351 is also provided with a collecting vessel 352 for possibly unvaporized $D_4$.

The after-treatment oven 4 is joined to the reaction oven 3 via conduit 331. The after-treatment oven decreases in temperature from the top downwardly over the range of 500°/250° to 250°/125° C. The hydrophobized material leaves the after-treatment oven 4 via a gate 431. Connected to the take-off tube of after-treatment oven 4 is a conduit 401 through which $N_2$ can be introduced into the after-treatment oven by means of a rotameter 40.

The gases supplied to the activating oven 1 can be introduced by rotameter 10 or can be recovered from the gas discharge tube 12 and after drying introduced into the upper circuit 123 and from there into the activating oven. The gas, such as nitrogen for the charge zone 2 can also be derived from the upper circuit 123 or via a tube from the rotameter 20. The gas, such as nitrogen required for the reaction oven 3 can be introduced from the lower circuit 223 or via a tube from the rotameter 30, while for the after-treatment oven 4, the rotameter 40 continuously supplies the required $N_2$ carrier gas derived from the circuit 123.

The process of the invention is carried out in the following manner:

An unthickened oxide aerogel directly coming from the production plant or an optionally aged oxide aerogel is introduced into the top of the activating oven 1 and there at a temperature of from 750° to 950° C converted into an absolutely dry product (Activation Stage I). The product is discharged from the bottom of oven 1 into the unheated charging zone 2. In the charging zone, the initial charging with e.g., the organopolysiloxane ($D_4$) vapor having a temperature of about 300°–350° C takes place (Charging Stage II). The thus charged oxide is then introduced into the reaction oven below which has a length of about 1–2 m and is heated to a temperature from 350°–650° C. Further organopolysiloxane is supplied to the reaction oven. The main i.e., essential reaction takes place in this oven (Reaction Stage III). An after treatment oven 4 having a temperature between 125° and 500° C completes the reaction (After-treatment Stage IV) and the hydrophobized product obtained from this stage can then be packed or stored.
+production plant The individual zones are all incorporated into a single apparatus, i.e., a single unit is involved. The process can be carried out continuously. Preferably at the beginning of the main reaction zone or in the charging zone a source of UV light radiation is provided.

By means of a branched flow below the activation zone (I), it is possible to remove excess $D_4$ for recirculation into the charging zone (II) and reaction zone (III). This will result in more effective feeding and thereby in better utilization of the $D_4$.

In the after-treatment zone (IV), it will be understood that the product contains only chemically firmly bonded $D_4$. The excess $D_4$ which cannot serve any further useful purpose in the hydrophobizing operation can be recovered for recycling into the process.

Charging stage (II) and main reaction stage (III) can also be carried out in concurrent flow, while for the activation stage (I) and the after-treatment stage (IV), countercurrent flow should be used.

It is also possible in accordance with the invention to carry out the activation required for the hydrophobizing of the silicic acid for the first time in the reaction zone, i.e., activation and reaction can be carried out in a single operational step. In this embodiment, the starting silicic acid, preferably before its introduction into the common activation and reaction zone III, is subjected to activation by UV energy. The charging with $D_4$ can take place at the same time; nitrogen or carbon dioxide are preferred carrier gases, air or oxygen are to be avoided in said embodiment. Of course, breadth and scope of possible variations depend considerably on the type of the silicic acid to be hydrophobized, in particular, on its moisture content.

In another variation of the process, the apparatus may consist only of the activation zone (I) and the charging zone (II). The $D_4$-charged $SiO_2$ can then be subjected, without contact with oxygen, to autoclaving at a temperture of 300°–400° C for about 1–2 hours to form stable hydrophobic products. In this way the removal of water and excess $D_4$ which is necessary in the conventional autoclave process is avoided.

The conversion of the silicic acid starting material to a hydrophobic product in the first described principal embodiment requires less than 2 minutes. Thus it is possible even with small size apparatus to obtain a high performance. This by itself represents a marked advance over the prior art processes which require at least 4 hours time to obtain a hydrophobic product.

The following examples are given for the purpose of illustrating the invention and are not be taken as limiting the same in any way.

EXAMPLE 1

Pyrogenic silicic acid ("Aerosil" of the Degussa Corporation of Germany) having a specific surface area of 200 $m^2/g$ (determined by the BET method) was treated in the above-described apparatus with $D_4$ (octamethyltetrasiloxane).

The pyrogenic silicic acid was pneumatically introduced at a rate of 500 g/hr. In the charging stage 7 ml/hr and in the reaction stage 7 ml/hr of $D_4$ in the form of a $N_2$-$D_4$ vapor mixture having a temperature of 300° C were blown in. The gas discharged from the charging stage was introduced into a condenser from which 35 ml $D_4$ per hour were recovered.

The hydrophobic product discharged from the apparatus had a carbon content of 2.6% corresponding to a $D_4$ content of 8%. It could not be wetted with water. After 2 hours of boiling with water in a reflux condenser, the product was still completely hydrophobic. The oxides as well as the polysiloxane vapors are fed in dry preheated nitrogen. However, air may also be used as the carrier gas for the oxide and in the activation stage predried air may be used.

EXAMPLE 2

A pyrogenic mixed $SiO_2/Al_2O_3$ type ("MOX") oxide manufactured by the Degussa Corporation of Germany having an $SiO_2$ content of 98.3% and an $Al_2O_3$ content of 1.3% (both percentages calculated with respect to the dry material) and a specific surface area of 80 $m^2/g$ (determined by the BET method) was treated with $D_4$ (octamethyltetrasiloxane) as described in Example 1.

The hydrophobic product produced has a carbon content of 1.6% corresponding to a $D_4$ content of 5%. It was not wettable with water. After 2 hours of boiling with water in a reflux device, the product was still fully hydrophobic.

EXAMPLE 3

Example 1 was repeated as described therein. Instead of using nitrogen a mixture of equal volumes of superheated steam and air at the temperature of 900° C is used in Activation Stage I. All other parts of the process are the same as described in Example 1.

The obtained product was exactly the same as the one obtained according to Example 1.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An oxidic product having hydrophobic charcteristics, comprising oxide particles including $SiO_2$ particles having surfaces which are substantially free of silanol groups bound to each other by hydrogen bridges; and at least one organosilicon compound chemically bonded to said surfaces so as to impart hydrophobic properties to said particles, said compound being bonded to each of the respective surfaces at locations corresponding to those at which isolated silanol groups were present and with which said compound reacted chemically to become bonded to said surfaces.

2. A product as defined in claim 1, wherein said surfaces are substantially free of acid.

3. A product as defined in claim 1, wherein said oxide particles also comprise an oxide of a metal.

4. A product as defined in claim 1, wherein said oxide particles comprise $SiO_2$ and $Al_2O_3$.

5. A product as defined in claim 1, wherein said compound comprises an organopolysiloxane.

6. A product as defined in claim 5, wherein said compound comprises a linear ogranopolysiloxane.

7. A product as defined in claim 5, wherein said compound comprises a cyclic organopolysiloxane.

8. A product as defined in claim 1, wherein said compound comprises a member of the group consisting of hexamethyldisiloxane, hexamethylcyclotrisiloxane, octamethylcyclotetrasiloxane, octamethyltrisiloxane and decamethyltetrasiloxane.

9. A product as defined in claim 1, wherein said compound comprises an organohalogensilane.

10. A product as defined in claim 9, wherein said compound comprises an organo-chlorosilane.

11. A product as defined in claim 10, wherein said compound comprises a member of the group consisting of alkyl monochlorosilanes, alkyl dichlorosilanes, alkyl trichlorosilanes, aryl monochlorosilanes, aryl dichlorosilanes, aryl trichlorosilanes, alkyl-aryl monochlorosilanes, alkyl-aryl dichlorosilanes and alkyl-aryl trichlorosilane.

12. A product as defined in claim 1, wherein said compound comprises a member of the group consisting of siloxanes and silanes.

13. A product as defined in claim 12, wherein both a silane and a siloxane are bound to said surfaces.

* * * * *